United States Patent [19]

Brzack

[11] 4,280,673

[45] Jul. 28, 1981

[54] GLIDER

[76] Inventor: Jeffrey A. Brzack, 140 Maumee Trail, Lake Orion, Mich. 48035

[21] Appl. No.: 48,610

[22] Filed: Jun. 13, 1979

[51] Int. Cl.³ .................. B64C 31/02; B64C 39/08; A63H 33/28

[52] U.S. Cl. .................. 244/13; D21/87; 46/79; 244/16; 244/45 R; 244/153 R

[58] Field of Search .............. 244/16, 34 A, 153 R, 244/13, 15, 36, 45 R; 46/79, 80, 81, 78, 76 R, 77; D21/87, 88, 89, 90

[56] References Cited

U.S. PATENT DOCUMENTS

| | | | |
|---|---|---|---|
| 1,939,682 | 12/1933 | Fleming | 244/45 R |
| 3,600,842 | 8/1971 | Bryman | 46/79 |
| 3,834,654 | 9/1974 | Miranda | 244/13 |
| 3,981,460 | 9/1976 | Ratony | 244/13 |
| 4,146,199 | 3/1979 | Wenzel | 244/45 R |

*Primary Examiner*—Charles E. Frankfort
*Attorney, Agent, or Firm*—Basile, Weintraub & Hanlon

[57] ABSTRACT

A glider formed from a multi-sided tube open at its ends is disclosed. The body and lifting surfaces of the glider comprise a multi-sided tube including a top wall of planar configuration; a pair of opposed upper side walls of planar configuration integral with the top wall extending downward and outward a distance; a pair of opposed vertical side walls of planar configuration integral with the upper side walls; a pair of opposed lower side walls of planar configuration integral with the side walls extending downward and inward to a point inward of a vertical extension of the top wall and upper side wall intersections; a bottom wall extending between lower end walls and integral therewith enclosing the structure. The bottom wall includes a pair of upward extending planar sections meeting at a mid point between lower end walls to form a ridge. An upper cut-out symmetrical about a center line of the tube removes a substantial portion of the upper surfaces, and a lower cut-out symmetrical with the center line works in concert with the upper cut-out to produce maximum lift and stability. The glider of the present invention is suitable for both powered and non-powered flight.

7 Claims, 2 Drawing Figures

GLIDER

BACKGROUND OF THE INVENTION

I. Field of the Invention

The present invention relates to the field of gliders, and more particularly to the field of gliders having a body of multi-sided tubular configuration. Even more particularly, the present invention relates to the field of gliders of multi-sided tubular configurations which are powered or non-powered.

II. Description of the Prior Art

A search of the issued United States patents reveals the following United States patents which are related to the field of the present invention. U.S. Pat. No. 1,378,193 discloses a glider type flying toy with a conical shaped tubular body with an open rear end. A pair of opposed tabs along an upper portion of the body support a wing to give lift to the apparatus. U.S. Pat. No. 3,600,842 discloses a bubble producing glider toy having a body of hollow cylindrical shape open at both ends. An upper portion of the cylinder is cut away beginning at a point spaced from an upper portion of the leading edge and tapering to the trailing edge where substantially all of the cylinderical form has been removed. A wire ring supported by a strut attached to the leading edge and concentric with the cylinder is employed to support a bubble producing liquid which creates bubbles as the toy glides through the air. U.S. Pat. No. 3,903,639 discloses a model airplane comprising a fuselage formed by a forward frame member and twin spaced booms extending rearward therefrom. A pair of cylinderical wings are supported by the forward frame and the twin booms respectively. An internal combustion engine driving a propeller is supported at the junction of the booms to power the device. U.S. Pat. No. 4,081,158 discloses a monocoque arched kite having an aerodynamic surface formed of a single sheet of stiff material arched about a longitudinal axis. The surface is more highly arched at a front end than at a rear end and has a large aperture located near the rearward half. A flying string is attached directly to the kite for flying it with the concave side of the surface deployed upward. None of the above listed United States patents disclose nor anticipate a glider having a body formed from a multi-sided tube open at its ends, with sides of planar configuration. The above listed United States patents constitute the entire art known to the Applicant and his Attorney.

SUMMARY OF THE INVENTION

The present invention comprises a glider with a body formed from a multi-sided tube open at its ends. The body includes a leading edge at a forward end thereof and a trailing edge. The tube comprises a top wall of planar configuration; a pair of opposed upper side walls of planar configuration integral with the top wall which extend downward and outward a distance; a pair of opposed vertical side walls of planar configuration integral with the upper side walls; a pair of opposed lower side walls of planar configuration integral with the side walls extending downward and inward to a point inward of a vertical expansion of the top wall and upper side wall intersection; and a bottom wall extending between the lower end walls and integral therewith to form a closed tube. The bottom wall comprises a pair of upward extending planar sections meeting at a mid point between lower end walls to form a ridge. The center of gravity for optimum performance, should be near to the leading edge. This is accomplished by selectively adding weight to the leading edge in the form of a plastic frame. The frame also adds rigidity to the structure enabling the glider to retain its designated shape while under stress during flight.

For best performances and stability the width of the tube between vertical walls exceeds the height between the top wall and the bottom wall by a factor of 2.1 to 2.7 (optimum approximately 2.5:1) and the length from leading edge to trailing edge should not exceed the width between vertical walls. While the proportions of the glider can lie outside of the optimum range defined hereinabove, optimum performance will be obtained employing the proportions within those defined above.

The lift and stability of the glider is further improved by an upper cut-out of symmetrical configuration removing a substantial portion of the upper surfaces of the tube. The upper cut-out is symmetrical with a center line of the tube and begins with a forward most point at a center of the top wall spaced in from the leading edge. The cut-out then extends in a straight line in opposed directions rearward and outward to a point vertically above and inward from the intersection of the bottom wall and the opposed lower side walls. From this point the upper cut-out extends in a more rearward and less outward straight line to the trailing edge where it terminates at a vertical center of the side walls. A lower cut-out is disposed along the lower surfaces of the tube extending forward from the trailing edge. The lower cut-out is in a form of a shallow "V" of symmetrical configuration. A point of the "V" begins at the ridge spaced toward the leading edge a distance from a line adjoining the trailing edge termination points of the upper cut-out. The lines of the "V" extend in a straight line from the point of the "V" to the termination points of the trailing edge.

The glider of applicant's invention is capable of either powered or non-powered flight. In a powered configuration either detachable or permanently affixed wheels can be added to a bottom portion of the glider for powered take off and landings.

For a more complete understanding of the present invention reference is made to the following detailed description and accompanying drawing.

Other objects, advantages, and applications of the present invention will become apparant to those skilled in the field to which this invention pertains, when the accompanying description of the best modes contemplated for practicing the invention are read in conjunction with the accompanying drawing.

BRIEF DESCRIPTION OF THE DRAWING

In the drawing, like reference numbers refer to like parts throughout the several views, and wherein.

DESCRIPTION OF THE PREFERRED EMBODIMENTS

Figure 1:
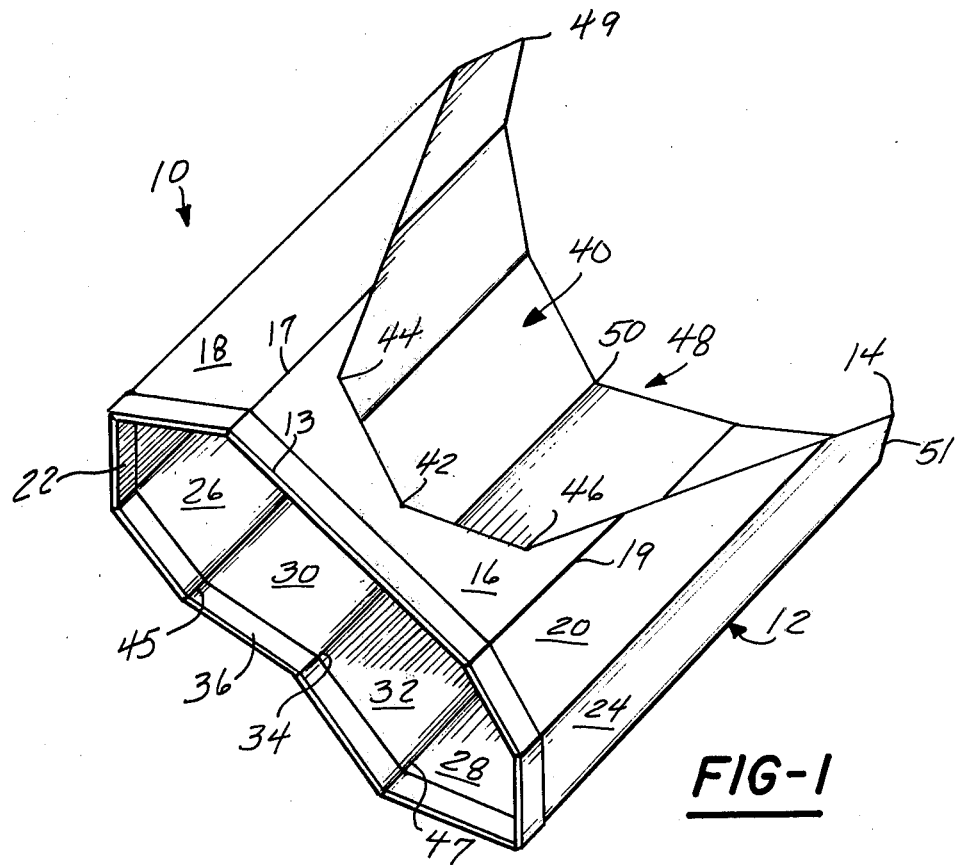
FIG. 1 illustrates a perspective view of the glider of the present invention.

In the drawing, FIG. 1 illustrates at 10 a preferred embodiment of the glider of the present invention. The glider of the present invention comprises a multi-sided tubular body 12 including a leading edge 13 and a trailing edge 14.

The multi-sided tubular body 12 comprises:

a top wall 16 of planar configuration;

a pair of opposed upper side walls 18,20 of planar configuration integral with the top wall extending downward and outward a distance;

a pair of opposed vertical side walls 22,24 of planar configuration integral with the upper side walls;

a pair of opposed lower side walls 26,28 of planar configuration integral with the side walls 22,24 extending downward and inward to a point inward of a vertical extension of a top wall and upper side wall intersection 17,19; and a bottom wall extending between lower end walls and integral therewith to close the tube, the bottom wall including a pair of upward extending planar sections 30,32 meeting at a center thereof forming a ridge 34.

A plastic frame 36 along the leading edge of the glider aids in removing a center of gravity of the overall structure to a point close to the leading edge. The frame also adds rigidity to the structure and it may be attached by various methods. (Gluing etc.)

A preferred proportion for the cross section of the tube comprises a width between vertical walls 22,24 that exceeds the height between the top wall 16 and the bottom wall 30,32 by a ratio of 2:1 to 2.3:1 (optimum 2.5:1). For optimum stability and guide path, the length from leading edge to trailing edge should not exceed the width between vertical walls 22,24. While an aerodynamically viable glider can be obtained using proportions other than those defined hereinabove, for optimum performance and stability the proportions defined are recommended.

The stability and glide path of the glider is substantially improved by an upper cut-out 40 along the upper surfaces of the tube 12 removing a substantial portion of material therefrom. The upper cut-out 40 is of symmetrical configuration about a center line of the tube 12. The upper cut-out begins at a forward-most point 42 at a center of the top wall spaced in from the leading edge. From the point 42, the upper cut-out 40 extends rearward and outward along a pair of opposed straight lines to a pair of points 44,46 vertically over and inward of an intersection 45,47 of the bottom wall and the opposed lower side walls. The upper cut-out 40 then extends from the points 44,46 along a second pair of opposed straight lines more rearward and less outward, the second pair of opposed straight lines terminating at a vertical center of the side walls at the trailing edge termination points 49,51. A lower cut-out 48 is disposed along the lower surfaces of the glider removing a portion of the lower surfaces near the trailing edge. The lower cut-out 48 is of shallow "V" shaped symmetrical configuration. A point of the "V" begins at the ridge spaced toward the leading edge from a line joining the trailing edge termination points 49,51 of the upper cut-out. The lines of the "V" extend in a straight line to the trailing edge termination points 49,51.

Vertical lift is provided as the glider moves through the air by the lower surfaces 26,28,30, and 32 utilizing well known aerodynamic principles. The upper surfaces 16,18 and 20 also provide a degree of vertical lift, however, their degree of contribution to the vertical lift is substantially less than that of the lower surfaces due to their reduced area. The upward sloping of the panels 30,32 producing the ridge 34 creates a substantial degree of lateral stability in a manner in which aircraft wings having dihedral produce lateral stability in well known aerodynamic technology. The sloping of the walls 18,20, 26, and 28 also contributes to the lateral stability as well as directional stability of the glider. The vertical side walls 22,24 provide most of the directional stability for the glider.

While the horizontal planar construction of the top wall 16 serves to produce a degree of vertical lift, the principle vertical lift is provided by the panels 30,32 of the bottom wall. The principle function of the top wall 16 is to close the tube and provide structural integrity for the multi-sided tubular body 12. The glider may be made from a light, durable sheet material such as polystyrene foam.

Figure 2:
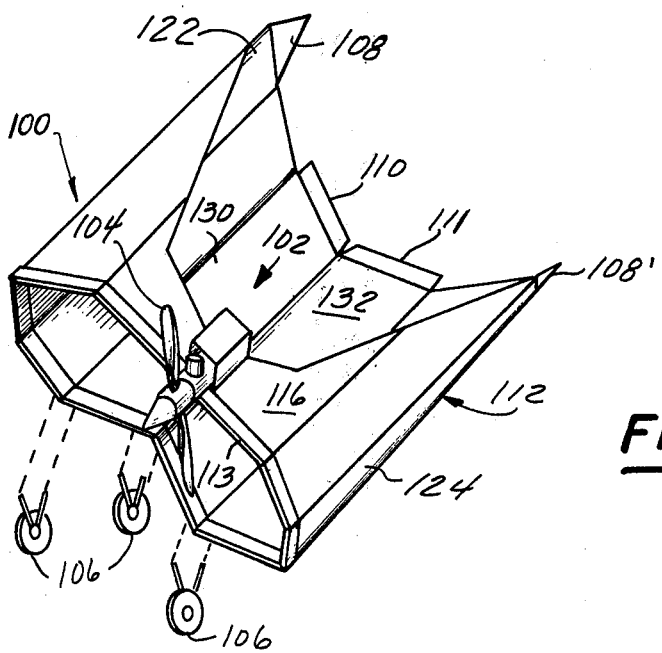
FIG. 2 illustrates a perspective view of an engine powered glider of the present invention.

In FIG. 2 of the drawing there is illustrated at 100 an alternate embodiment of the present invention wherein the glider is powered. In the powered configuration a multi-sided tube 112 has affixed to the top wall 116 at the center of the leading edge 113 a power source 102. The power source 102 comprises an internal combustion engine rotatably driven by a propeller 104. The internal combustion engine 102 is mounted to the top wall 116 by means of bolts or threaded fasteners which fixedly attach the engine to the top wall 116.

Directional control of the glider 100 during powered flight is established by means of a pair of hinged rudders 108, 108' hinged to a rearward most portion of the vertical side walls 122,124. A pair of elevators 110,111 hinged to the edges of bottom wall panels 130,132 provide vertical control for the glider in flight.

For a powered take off and landing a plurality of wheels 106 are affixed to a lower portion of the device (FIG. 2).

Having thus described my invention, what I claim is:

1. A glider including a body formed from a multi-sided tube open at it's ends with a leading edge at a forward end and a trailing edge comprising:

a top wall of planar configuration;

a pair of opposed upper side walls of planar configuration, integral with the top wall, extending downward and outward a predetermined distance;

a pair of opposed vertical side walls of planar configuration integral with the upper side walls;

a pair of opposed lower side walls of planar configuration, integral with the vertical side walls, extending downward and inward to a point inward of a vertical extension of the top wall and upper side wall intersection;

a bottom wall extending between the lower ends of said lower side walls and integral therewith, the bottom wall including a pair of upward extending planar sections meeting at a center thereof forming a ridge;

an upper cut-out of symetrical configuration with a forward most point beginning at a center of the top wall spaced in from the leading edge, extending rearward and outward along a first pair of opposed straight lines to a point vertically above and inward of the intersection of the bottom wall and the opposed lower side walls, then extending along a second pair of opposed straight lines more rearward and less outward terminating at the center of the vertical side walls at the trailing edge; and a lower cut-out of shallow "V" shaped symetrical configuration with the point of the "V" beginning at said ridge spaced toward the leading edge with respect to a line joining the trailing edge termination points of the upper cut-out, and extending in a straight line to the points of trailing edge termination.

2. The glider as defined in claim 1 further comprising:
a plastic frame along the leading edge; and
weight selectively added at the leading edge to produce a center of gravity near the leading edge.

3. The glider as defined in claim 1 further comprising a width between vertical walls that exceeds the height between the top wall and the bottom wall, and a length that is less than the width.

4. The glider as defined in claim 1 further comprising a power source located proximate the center of gravity for thrusting the glider in a forward direction.

5. The glider as defined in claim 1 further comprising a plurality of wheels affixed to the bottom wall for take off and landing the glider.

6. The glider as defined in claim 1 further comprising a pair of elevators hinged to the bottom wall to provide control for the glider in flight.

7. The glider as defined in claim 1 further comprising a pair of rudders hinged to a rearmost portion of the vertical side walls to provide directional control in flight.

* * * * *